United States Patent
Cambruzzi et al.

(10) Patent No.: US 11,703,823 B2
(45) Date of Patent: Jul. 18, 2023

(54) METHOD AND ASSEMBLY DEVICE FOR THE AUTOMATED DETERMINATION OF A DRILLING POSITION OF A DRILL HOLE

(71) Applicant: Inventio AG, Hergiswil (CH)

(72) Inventors: Andrea Cambruzzi, Zürich (CH); Eliza Olczyk, Lucerne (CH); Erich Butler, Ebikon (CH); Oliver Simmonds, Lucerne (CH); Philipp Zimmerli, Harkingen (CH); Raphael Bitzi, Lucerne (CH)

(73) Assignee: INVENTIO AG, Hergiswil (CH)

( * ) Notice: Subject to any disclaimer, the term of this patent is extended or adjusted under 35 U.S.C. 154(b) by 231 days.

(21) Appl. No.: 17/309,028

(22) PCT Filed: Nov. 12, 2019

(86) PCT No.: PCT/EP2019/080924
§ 371 (c)(1),
(2) Date: Apr. 15, 2021

(87) PCT Pub. No.: WO2020/104240
PCT Pub. Date: May 28, 2020

(65) Prior Publication Data
US 2022/0009006 A1    Jan. 13, 2022

(30) Foreign Application Priority Data
Nov. 20, 2018   (EP) ..................................... 18207127

(51) Int. Cl.
*G05B 19/402*   (2006.01)
*B23B 39/08*    (2006.01)
(Continued)

(52) U.S. Cl.
CPC ............ *G05B 19/402* (2013.01); *B23B 39/08* (2013.01); *G05B 19/182* (2013.01); *G05B 19/19* (2013.01); *G05B 19/401* (2013.01)

(58) Field of Classification Search
CPC ........ B23B 39/08; G05B 15/02; G05B 19/402
See application file for complete search history.

(56) References Cited

U.S. PATENT DOCUMENTS 10,843,902 B2 * 11/2020 Studer ................... B66B 19/002
2001/0032841 A1 * 10/2001 Fukushima .......... H05B 6/6447
219/723

(Continued)

FOREIGN PATENT DOCUMENTS

CN   105829234 A   8/2016
CN   106348129 A   1/2017
(Continued)

*Primary Examiner* — Ronald D Hartman, Jr.
(74) *Attorney, Agent, or Firm* — William J. Clemens; Shumaker, Loop & Kendrick, LLP

(57) ABSTRACT

A method and an assembly device for automated determination of a drilling position of a drill hole for a fastener for fastening a component to a possible wall area of a wall, wherein the method steps include: determining a surface contour of the wall area; examining the surface contour and detecting first irregularities in the surface contour using a first detection rule; determining a primary possible support surface area and a primary possible drilling position area that do not have any of the detected first irregularities; examining the surface contour of the primary possible drilling position area and detecting second irregularities in the surface contour using a second detection rule; and determining the drilling position inside the primary possible drilling position area such that the surface contour at the drilling position does not have any of the detected second irregularities.

15 Claims, 4 Drawing Sheets

(51) Int. Cl.
  *G05B 19/18*  (2006.01)
  *G05B 19/19*  (2006.01)
  *G05B 19/401* (2006.01)

(56) References Cited

U.S. PATENT DOCUMENTS

2017/0132775 A1    5/2017  Ramamurthy et al.
2017/0343332 A1*  11/2017  Tam ........................ G01B 7/08

FOREIGN PATENT DOCUMENTS

| | | | | | |
|---|---|---|---|---|---|
| CN | 107848767 | A | | 3/2018 | |
| CN | 107922166 | A | | 4/2018 | |
| CN | 106017289 | B | * | 7/2018 | ............... G01B 5/28 |
| CN | 110595337 | A | * | 12/2019 | ............... G01B 5/28 |
| CN | 217303868 | U | * | 8/2022 | |
| CN | 217504645 | U | * | 9/2022 | |
| CN | 217764825 | U | * | 11/2022 | |
| EP | 3323762 | A1 | | 5/2018 | |
| JP | H04182289 | A | | 6/1992 | |
| JP | H05105362 | A | | 4/1993 | |
| JP | H05228897 | A | | 9/1993 | |
| JP | H07151119 | A | | 6/1995 | |
| JP | 6222861 | B1 | | 10/2017 | |
| WO | 2017016781 | A1 | | 2/2017 | |
| WO | 2017016782 | A1 | | 2/2017 | |
| WO | WO-2017016782 | A1 | * | 2/2017 | ............. B66B 11/00 |
| WO | 2017167719 | A1 | | 10/2017 | |
| WO | 2018145984 | A1 | | 8/2018 | |
| WO | WO-2018145984 | A1 | * | 8/2018 | ............. B32B 37/00 |

* cited by examiner

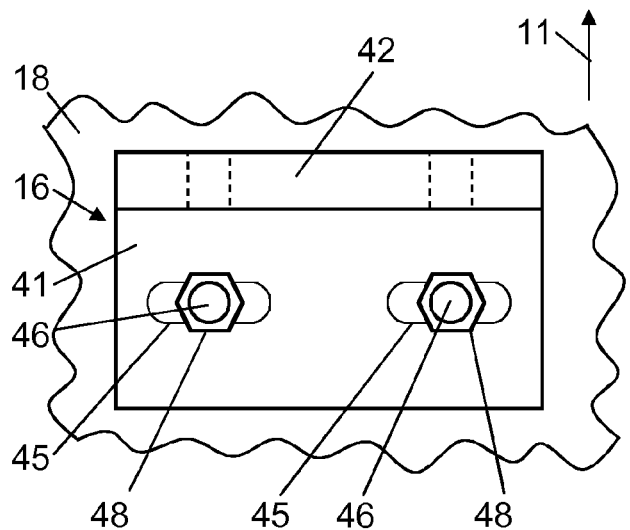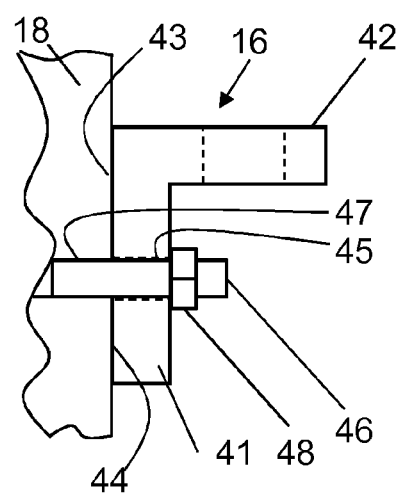
Fig. 3          Fig. 4
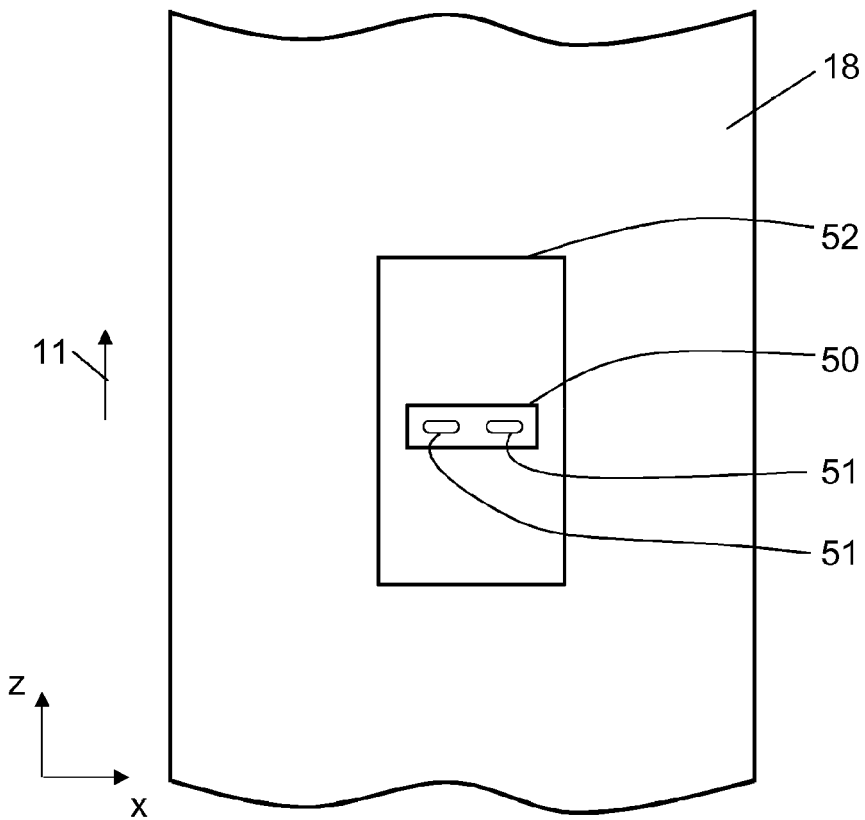
Fig. 5

METHOD AND ASSEMBLY DEVICE FOR THE AUTOMATED DETERMINATION OF A DRILLING POSITION OF A DRILL HOLE

The invention relates to a method for the automated determination of a drilling position of a drill hole and an assembly device for the automated determination of a drilling position of a drill a hole.

BACKGROUND

In WO 2017/016782 A1, a method for carrying out an installation process in an elevator shaft of an elevator installation is described, wherein drill holes are also drilled in a shaft wall of an elevator shaft of the elevator installation. It is described that the condition of the shaft wall in terms of unevenness, ledges or holes can be detected by means of a scanning component. The information thus obtained can be used for example for a change to a planned drilling position of the drill holes. WO 2017/016782 A1 does not however contain further information as to how the planned drilling position is to be changed.

In WO 2018/145984 A1, a method for fixing a rail bracket of an elevator installation to a shaft wall is described. The rail bracket is glued to the shaft wall, wherein its can additionally be fixed to the shaft wall by a fixing element, for example in the form of a screw. In order to be able to screw a screw into a shaft wall, a drilling position of a drill hole must first be determined and the drill hole then has to be drilled. The rail bracket has a through-opening, through which the screw projects in the screwed-in state. To establish the drilling position, a possible wall area for the drilling position and therefore a support surface of the rail bracket on the shaft wall is first established, the surface contour whereof is determined. The surface contour is examined and irregularities are detected. The drilling position and therefore the aforementioned support surface are established in such a way that there are no overlaps with the detected irregularities.

SUMMARY

On the other hand, it is in particular the problem of the invention to propose a method and an assembly device for the automated determination of a drilling position of a drill hole, by means of which a drilling position can quickly be found at which the drilling can with a high degree of probability be carried out successfully.

In the method according to the invention for the automated determination of a drilling position of a drill hole, a drilling position of a drill hole for a fixing means is determined, by means of which a component can be fastened to a possible wall area of a wall. The component comprises a contact surface and a through-opening, wherein, in the fastened state of the component to the wall, at least a part of the contact surface abuts against a support surface of the wall and the fastening means fixed in the drill hole projects through the through-opening. The aforementioned possible wall area at which the component is to be fastened is mainly flat and extends in a first direction (x) and a second direction (z) perpendicular to the first direction (x). A planned support surface inside the wall area, against which the contact surface of the component at least partially abuts in the assembled state, and therefore a planned drilling position area for the drill hole are preselected.

The method according to the invention comprises the following process steps:

- determination of a surface contour of the wall area,
- examination of the surface contour of the wall area and detection of first irregularities in the surface contour by means of a first detection rule,
- determination of a primary possible support surface area and a first possible drilling position area for the drill hole, which has no first irregularities of the surface contour,
- examination of the surface contour of the primary possible drilling position area for the drill hole and detection of second irregularities in the surface contour by means of a second detection rule and
- determination of the drilling position for the drill hole inside the primary possible drilling position area, in such a way that the surface contour at the drilling position does not have any second irregularities.

The aforementioned process steps are carried out in particular in the sequence as stated. It is however also possible for them to be carried out in a different sequence.

After the determination of the aforementioned drilling position, the drill hole is drilled, in particular by an assembly device for the automated implementation of the assembly steps, by means of a drilling device, in particular a percussion drilling machine, at the aforementioned drilling position. The fastening of the component can also be carried out by the assembly device or manually by an assembler.

An automated determination should be understood here to mean that the determination is carried out by a control device using predefined rules. For this purpose, a program is in particular stored in the control device, in which the aforementioned rules are coded. The automated determination can be started for example by an operator or by another program. The control device is in particular part of an assembly device for the automated implementation of the assembly steps.

The aforementioned component, which is fastening to a wall by means of a fastening means, for example a screw or anchor bolt, can be constituted in many different ways. The component can for example be constituted as a so-called shaft material of an elevator installation. This is understood to mean all components which are fastened to a shaft wall in an elevator shaft of an elevator installation. These include for example so-called rail brackets or parts of rail brackets, in particular rail bracket lower parts, by means of which guide rails of the elevator installation are fixed to the shaft wall. Moreover, a shaft material can also be constituted as a fastening material for shaft doors, illumination or cabling. The component can for example also be constituted as a holder, by means of which cable ducts or ventilation pipes can be fixed to a ceiling or a wall of a room. Moreover, a multiplicity of other embodiments of the component is conceivable.

The component comprises a contact surface which, in a fastened state of the component, abuts at least partially against a support surface of the wall, so that the component is supported at the wall by means of the support surface. Arranged inside or at the edge of the support surface is the aforementioned through-opening, through which the fastening means fixed in the drill hole projects in the fastened state of the component. The component is thus pressed by the fastening means against the support surface of the wall and is therefore fastened to the wall. For this purpose, the fastening means can comprise for example a head or a nut, which can exert a force on the component in the direction of the wall. The through-opening and the support surface have a fixed spatial arrangement with respect to one another. However, it is possible for the through-opening and the fastening means to be constituted such that the fastening means can project at different positions through the through-opening. The through-opening is then constituted in particular as a so-called elongated hole.

A wall should be understood here as a chiefly flat or level surface, to which a component can be fastened. The wall is constituted for example as a wall, a ceiling or a floor of a building. In particular the wall is constituted as a shaft wall of an elevator shaft of an elevator installation. It is however also possible for the wall to constitute part of a bridge or another structure. The wall is made in particular of concrete, which in particular contains reinforcements. When the wall is erected, it is primarily the aim to erect a completely flat wall. Usually, however, this cannot be achieved. Especially with the erection of a wall made of concrete, wherein liquid concrete is cast into a mold formed by formwork, deviations always arise from a completely flat wall, for example at transitions of formwork parts adjacent to one another. Such deviations are referred to in the following as irregularities. The irregularities can for example be constituted as elevations, for example in the form of ledges, or depressions, for example in the form of holes.

The possible wall area should be understood here to mean an area of the wall at which the component is to be fastened. The possible wall area can result for example from a planned position of an element fixed with the component to the wall. When the component is constituted as the rail bracket lower part for fixing a guide rail of an elevator installation, the possible wall area results from the predefined course of the guide rail and the possible positioning of the guide rail with respect to the rail bracket lower part. Apart from this, the possible working area of an assembly device performing the process can have an influence on the possible wall area. A possible working area should be understood here to mean the area in which the assembly device can perform assembly steps. In particular, the possible wall area may in this case comprise only the part of the wall which lies inside the working area of the assembly device.

The planned support surface inside the wall area should be understood here to mean a region of the wall area of the wall, at which the contact surface of the component abuts against the wall in the ideal case. The planned support surface thus also establishes a planned position of the component on the wall. The planned support surface area is specified for example by an operator or results from preceding work steps of the assembly device performing the method. The specification of the planned support surface area also specifies a planned drilling position area for the drill hole. If the through-opening and the fastening means are constituted such that the fastening means can project through the through-opening at only one position, the planned drilling position area consists of only one planned drilling position. If the through-opening is constituted for example as an elongated hole, the planned drilling position area comprises a plurality of drilling positions.

The determination of the surface contour of the wall area takes place for example by means of a scanner, which is able to measure the distance to the surface or more precisely to wall points of the wall and is positioned at different points with respect to the wall. The respective position of the scanner is known. The scanner is moved for example in a zigzag pattern along the wall area and measures according to fixed path distances the distance to the wall points of the surface. The scanner can also be positioned for example such that the measured wall points form a grid with fixed spacings. The measured wall points have for example a distance between 1 and 5 mm from one another. A position of a wall point on the surface of the wall can be determined from the position and alignment of the scanner and the measured distance. The surface contour of the wall area can be determined from the positions of a plurality of wall points of the wall area. The determination of the surface contour can also take place in a different way, for example by means of a digital camera, in particular a stereo camera.

In particular, an ideal wall surface is determined in the determination of the surface contour of the wall area with the ascertained positions of the wall points. The ideal wall surface can for example be determined in such a way that the sum of the squares of the distances of the wall points from the ideal wall surface is minimal, i.e. the least squares method is used. It is also possible for the so-called RANSAC algorithm ("random sample consensus") to be used to determine the ideal wall surface. Following the determination of the ideal wall surface, the distances of the individual wall points from the ideal wall surface are determined. These distances serve as a basis for the detection of irregularities in the surface contour of the wall area. In the following, it will be assumed that the ideal wall surface extends in the first direction (x) and the second direction (z) perpendicular to the first direction (x). The aforementioned distances of the wall points from the ideal wall surface thus correspond to a position of the wall points in a third direction (y) perpendicular to the first and second directions.

After the determination of the surface contour of the wall area, the latter is examined and first irregularities in the surface contour detected by means of a first detection rule. For example, a first irregularity can be detected at a wall point when the distance of the wall point from the ideal wall surface is greater than a first threshold value.

A primary possible support surface area and a primary possible drilling position area are then determined. The two areas are characterized by the fact that on the one hand they are large enough to serve as a support surface or to accommodate the drill hole and on the other hand do not have a first irregularity in the surface contour. On the basis of these two conditions, the primary possible support surface area and the primary possible drilling area can be determined in a straightforward manner.

After the determination of the primary possible drilling area, the surface contour of the primary possible drilling area is again examined and second irregularities are detected by means of a second detection rule. For example, a second irregularity can be detected at a wall point when the distance of the wall point from the ideal wall surface is greater than a second threshold value, which for example is less than the aforementioned first threshold value. In the renewed examination of the surface contour, recourse can also be taken to results or at least intermediate results of the first examination of the surface contour. In particular, only the surface contour of the primary possible drilling area is reexamined and not the entire possible wall area or in addition the primary possible support surface area.

After the detection of the aforementioned second irregularities, the drilling position for the drill hole is established inside the primary possible drilling hole area, in such a way that the surface contour at the drilling position does not have second irregularities. With the establishment of the drilling position, the support surface or at least a possible area of the support surface is established. The second irregularities of the surface contour are thus taken into account only in the establishment of the drilling position and not also in the establishment of a support surface, which enables a very rapid and efficient establishment of the drilling position.

The idea underlying the approach according to the invention is that possible irregularities in the surface contour are more critical for the drilling of a drill hole than irregularities in the support surface for the fastening of the component to the wall. In other words, that a more precise examination for irregularities in the surface contour is required for the establishment of the drilling position than in the establishment of the support surface. The effect of this more precise examination for irregularities in the surface contour for the establishment of the drilling position is that the drilling of the drill hole at the drilling position thus determined can be carried out with a very high probability of success.

In order to establish the drilling position inside the primary possible drilling position area, it is possible to proceed for example as follows. For this purpose, an examination is first made to establish whether the planned drilling position area for the drill hole lies inside the primary possible drilling position area. If this is the case, the planned drilling position area is adopted as a start area for an examination area for the examination for second irregularities in the surface contour. If the planned drilling position area does not lie inside the primary possible drilling position area, the planned start area for the examination for second irregularities in the surface contour results from shifting the planned drilling position area in a so-called main displacement direction, which in particular runs either in the aforementioned first direction (x) or second direction (z). If the component to be fastened is constituted as a rail bracket lower part for fixing a guide rail in an elevator shaft, the main displacement direction is in particular vertical, here in the direction of the second direction (z). This results from the fact that the position of a rail bracket lower part is less critical in the vertical direction than in the horizontal direction, here the first direction (x). Once the aforementioned examination area for the examination for second irregularities in the surface contour is determined, an examination is made to establish whether a possible drilling position can be found therein, which does not have any second irregularities. If such a possible drilling position is found, this is adopted as the drilling position for the drill hole. If no such possible drilling position can be found, the aforementioned examination area is shifted by a fixed distance of for example 2 to 5 mm in the main displacement direction. An examination is then again made to establish whether a possible drilling position can be found in the examination area, which does not have any second irregularities. The displacement and the examination is in particular repeated until such time as a possible drilling position is found.

It is possible for the component to be fastened to the wall to comprise two through-holes, so that two drill holes have to be drilled in a defined position relative to one another for the fastening of the component to the wall. In this case, two drilling positions have to be determined, which have a defined position relative to one another. The method according to the invention can be applied analogously, wherein an examination must also be made to establish that the drill holes determined by the method also have the defined position relative to one another.

In an embodiment of the invention, the primary possible support surface area is determined in such a way that a distance between the planned support surface and the primary possible support surface area is as small as possible. The effect of this is that the drilling position is determined such that the component can be fastened to the wall as close as possible to its planned position.

In an embodiment of the invention, the first detection rule for detecting first irregularities in the surface contour comprises the following steps:
 determination of wall points which have a distance from the ideal wall surface that is greater than a first threshold value,
 combination of adjacent wall points which meet the aforementioned condition, and
 detection of a first irregularity when a surface area of the combined wall points is greater than a limiting surface area.

The first threshold value amounts for example to between 5 and 10 mm and the limiting surface area for example to between 15 and 30 $cm^2$. In the aforementioned combination of the wall points, the wall points are for example combined which meet the aforementioned condition and moreover have a distance from another wall point meeting the aforementioned condition which is less than a limiting distance of for example 5 to 50 mm. In addition, a rectangle can be defined in the combination, which contains all the aforementioned wall points and the edges of which run in the aforementioned first direction (x) or in the aforementioned second direction (z). This enables a particularly straightforward determination of the surface area of the combined wall points.

The described approach for detecting first irregularities enables a very rapid determination of the primary possible support surface area and of the primary possible drilling position area for the drill hole.

In an embodiment of the invention, the primary possible support surface area has the shape of a rectangle, wherein edges of the aforementioned rectangle run in the first direction (x) or the second direction (z) and the aforementioned rectangle extends in the first direction (x) over the entire possible wall area. The effect of this is that the first irregularity at a specific position in the second direction (z) and an arbitrary position in the first direction (x) leads to an exclusion of all positions in the first direction (x) and of the aforementioned position in the second direction (z). This enables a particularly rapid determination of the primary possible support surface area and of the primary possible drilling position area for the drill hole.

The aforementioned main displacement direction runs in particular, as described above, in the second direction (z), in particular the vertical direction.

In an embodiment of the invention, the second detection rule for detecting second irregularities in the surface contour comprises the following steps:
 determination of wall points which have a distance from the ideal wall surface which is greater than a second threshold value, and
 detection of a second irregularity at each wall point which meets the aforementioned condition.

The described detection of a second irregularity at each wall point meeting the aforementioned condition enables a very precise determination of the second irregularities and thus enables a particularly reliable determination of a suitable drilling position.

The second threshold value can be the same as the aforementioned first threshold value or can differ from the latter. The second threshold value can in particular be less than the first threshold value and amount for example to between 3 and 5 mm.

In an embodiment of the invention, third irregularities in the surface contour of the primary possible drilling position area are detected by means of a third detection rule between the determination of the primary possible drilling position area and the drilling position of the drill hole. The third detection rule comprises the following steps:

determination of wall points which have a distance from the ideal wall surface which is greater than a third threshold value and combination of adjacent wall points which meet the aforementioned condition, and a secondary possible drilling area for the drill hole is determined depending on the third irregularities in the surface contour.

A secondary possible drilling area for the drill hole can thus be determined very quickly, proceeding from which, as described above, the drilling position can be established depending on the second irregularities. This two-stage approach enables a particularly effective determination of the drilling position.

The third threshold value can be the same as the aforementioned first threshold value or the aforementioned second threshold value or can differ from the latter. The third threshold value can amount for example to between 3 and 10 mm.

In addition, a rectangle can be defined during the combination of the wall points meeting the third condition, which contains all the aforementioned wall points and the corners of which run in the aforementioned first direction (x) or the aforementioned second direction (z). This makes it possible to take account of the combined wall points in a particularly straightforward manner.

In particular, only the surface contour of the primary possible drilling area is reexamined and not the entire possible wall area or also the primary possible support surface area.

It is also possible that, after the determination of the ideal wall surface, the first, second and third irregularities for the entire possible wall area are determined in a common work step.

The secondary possible drilling area for the drill hole is determined in particular depending on the third irregularities, in such a way that a degree of overlap of the through-opening of the component with the third irregularities in the surface contour is less than a first limiting value. The first limiting value can amount for example to between 10 and 30% related to the through-opening. This approach is particularly suitable when the through-opening is constituted as an elongated hole.

In an embodiment of the invention, only a displacement in a main displacement direction is carried out for the determination of the secondary possible drilling area for the drill hole, which is already described above. This enables a particularly straightforward determination of the secondary possible drilling area for the drill hole.

In an embodiment of the invention, the course of the reinforcements in the wall in the primary possible drilling position area for the drill hole is determined and taken into account in the determination of the drilling position of the drill hole. A reinforcement is understood here to mean a single reinforcement inside the wall, which cannot be detected on the basis of the surface structure of the wall. A reinforcement usually consists of a rod made of iron or steel, which is arranged together with further reinforcements as a grid. A drill hole should if at all possible not run through a reinforcement, since the reinforcement can damage a drill performing the drilling and the drilling process can moreover last for a very long time. The determination and taking account of the course of the reinforcements thus enables a rapid and cost-effective implementation of the following drilling process. The detection and taking account of the reinforcements could take place for example as described in WO 2017/016782 A1.

In an embodiment of the invention, the aforementioned course of the reinforcements in the wall is taken into account only together with the second irregularities in the surface contour and/or the third irregularities in the surface contour. The aforementioned course of the reinforcements is therefore not taken into account together with the first irregularities. This approach makes it possible for the examination for first irregularities in the surface contour to the able to be carried out very quickly. This enables a particularly rapid determination of the drilling position.

When account is taken of the course of the reinforcements together with the third irregularities, only reinforcements are, in particular, taken into account which run crosswise to the aforementioned main displacement direction, i.e. in particular chiefly horizontally. This enables rapid account to be taken of the course of the reinforcements. When account is taken of the course of the reinforcements together with the second irregularities, all the reinforcements in particular are taken into account. The course of the reinforcements is thus taken into account in a precise manner.

The drilling position of the drill hole is determined in particular such that a distance of the drilling position from a reinforcement is as large as possible. The probability that the subsequent drilling can thus be carried out without impairment due to a reinforcement is thus particularly high. If it has not been possible to find a drilling position, without impairment due to a reinforcement having to be taken into account, an impairment due to a reinforcement can also be accepted. This can in particular only take place when an operator of an assembly device carrying out the method has received a corresponding message, and has approved the plan of action for example via a corresponding input at an operator interface.

In an embodiment of the invention, in the case in which no drilling position of the first drill hole inside the possible wall area has been found, a new possible wall area is selected. It is thus made possible for a suitable drilling position at the wall to be determined. The new possible wall area results in particular from a displacement of the original possible wall area in the aforementioned main displacement direction. The displacement takes place in particular such that a primary possible support surface area and a primary possible drilling position area, which are arranged at an edge of the original possible wall area lying in the main displacement direction, are also contained in the new possible edge area. The displacement takes place in particular in such a way that the aforementioned overlapping area between the original and new possible wall area is as large as possible. The direction of the displacement thus also results, i.e. for example vertically upwards or downwards.

When the method is carried out by an assembly device for implementing automated assembly steps, the assembly device is displaced for the selection of the new possible wall area. As a result of the displacement of the assembly device, a new work area of the assembly device results, which enables a new possible wall area.

The aforementioned problem is also solved by an assembly device for the automated determination of a drilling position of a drill hole for a fastening means for fastening a component to a possible wall area of a wall. The component comprises a contact surface and a through-opening, wherein in a fastened state of the component to the wall at least a part of the contact surface abuts against a support surface of the wall and the fastening means fixed in the drill hole projects through the through-opening. The aforementioned possible wall area, at which the component is to be fastened, is mainly flat and extends in a first direction (x) and a second direction (z) perpendicular to the first direction (x). A planned support surface inside the wall area, against which the contact surface of the component abuts at least partially in the assembled state, and therefore a planned drilling position area for the drill hole are preselected. The assembly device comprises a control device, which is provided to carry out the following steps:

determination of a surface contour of the wall area, examination of the surface contour of the wall area and detection of first irregularities in the surface contour by means of a first detection rule, determination of a primary possible support surface area and a primary possible drilling position area for the drill hole, which does not have any first irregularities of the surface contour, examination of the surface contour of the primary possible drilling position area for the drill hole and detection of second irregularities in the surface contour by means of a second detection rule and determination of the drilling position for the drill hole inside the primary possible drilling position area, in such a way that the surface contour at the drilling position does not have any second irregularities.

It is pointed out that some of the possible features and advantages of the invention herein are described with regard to different embodiments of the method according to the invention on the one hand and of the assembly device according to the invention on the other hand. The person skilled in the art recognizes that the features can be combined, adapted, transferred or exchanged in a suitable way in order to arrive at further embodiments of the invention.

Further advantages, features and details of the invention emerge with the aid of the following description of examples of embodiment and with the aid of the drawings, in which identical elements or elements with the same function are provided with the same reference numbers. The drawings are only diagrammatic and not true to scale.

DESCRIPTION OF THE DRAWINGS

In the figures:

FIG. 3 shows a component in the form of a rail bracket lower part in a view from the front, FIG. 4 shows the rail bracket lower part from FIG. 3 in a view from the side, FIG. 5 shows a possible wall area with a planned support surface and two planned drilling position areas.

DETAILED DESCRIPTION

A method and an assembly device for the automated determination of a drilling position of a drill hole in connection with the assembly of an elevator installation in an elevator shaft. The use of such a method and such an assembly device is however not limited to the described case of application, but can also be used for other purposes. For this purpose, adaptations to the method and the assembly device may be necessary, which the person skilled in the art can carry out without problem with this specialist knowledge and the remaining description.

Figure 1:
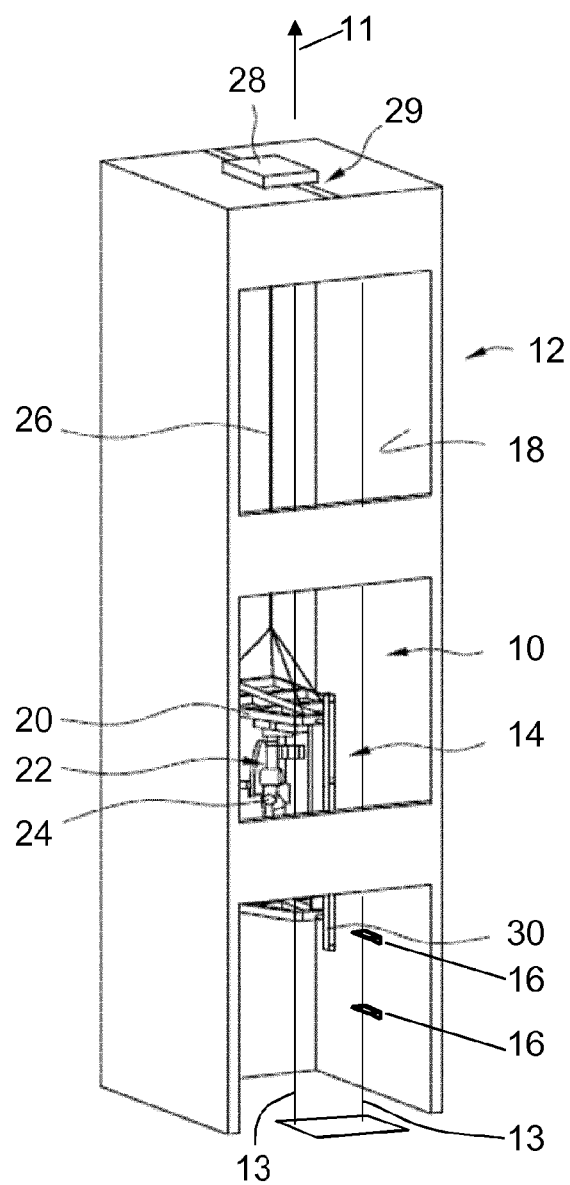
FIG. 1 shows a perspective view of an elevator shaft of an elevator installation with an assembly device accommodated therein.

FIG. 1 represents an assembly device 14 arranged in an elevator shaft 10 of an elevator installation 12, by means of which rail bracket lower parts 16 can be fixed to a shaft wall 18. Elevator shaft 10 extends in a main extension direction 11, which is vertically aligned in FIG. 1. By means of rail bracket lower parts 16, guide rails (not represented) of the elevator installation 12 can be fixed to shaft wall 18 in a subsequent assembly step. Assembly device 14 comprises a support component 20 and a mechatronic installation component 22. Support component 20 is constituted as a frame, on which the mechatronic installation component 22 is mounted. This frame has dimensions which make it possible to displace support component 20 vertically inside elevator shaft 10, i.e. for example to move to the vertical positions at different floors inside a building. Mechatronic installation component 22 in the represented example is constituted as an industrial robot 24, which is fitted to the frame of support component 20 hanging downwards. An arm of industrial robot 24 can be moved relative to support component 20 and displaced for example towards shaft wall 18 of elevator shaft 10.

Support component 20 is connected, by means of a steel rope serving as support means 26, to a displacement component 28 in the form of a motor-driven cable winch, which is fitted at the top to elevator shaft 10 at a stop point 29 at the roof of elevator shaft 10. With the aid of displacement component 28, assembly device 14 can be displaced inside elevator shaft 10 in main extension direction 11 of elevator shaft 10, i.e. vertically over the entire length of elevator shaft 10.

Assembly device 14 also comprises a fixing component 30 and support rollers 31 (see FIG. 2), with the aid of which support component 20 can be fixed inside elevator shaft 10 in a lateral direction, i.e. in the horizontal direction.

Two reference elements 13 in the form of cords can be stretched in elevator shaft 10 over its entire length, which cords are aligned along main extension direction 11. Reference elements 13 are fitted by an assembler in elevator shaft 10 and form the reference for the alignment and assembly of guide rails of elevator installation 12. The guide rails must therefore run parallel to reference elements 13 in the assembled state and at a specific distance from reference elements 13. From the course of reference elements 13, the course of the guide rails and therefore the planned position of rail bracket lower parts 16 at side wall 18 can be concluded.

Figure 2:
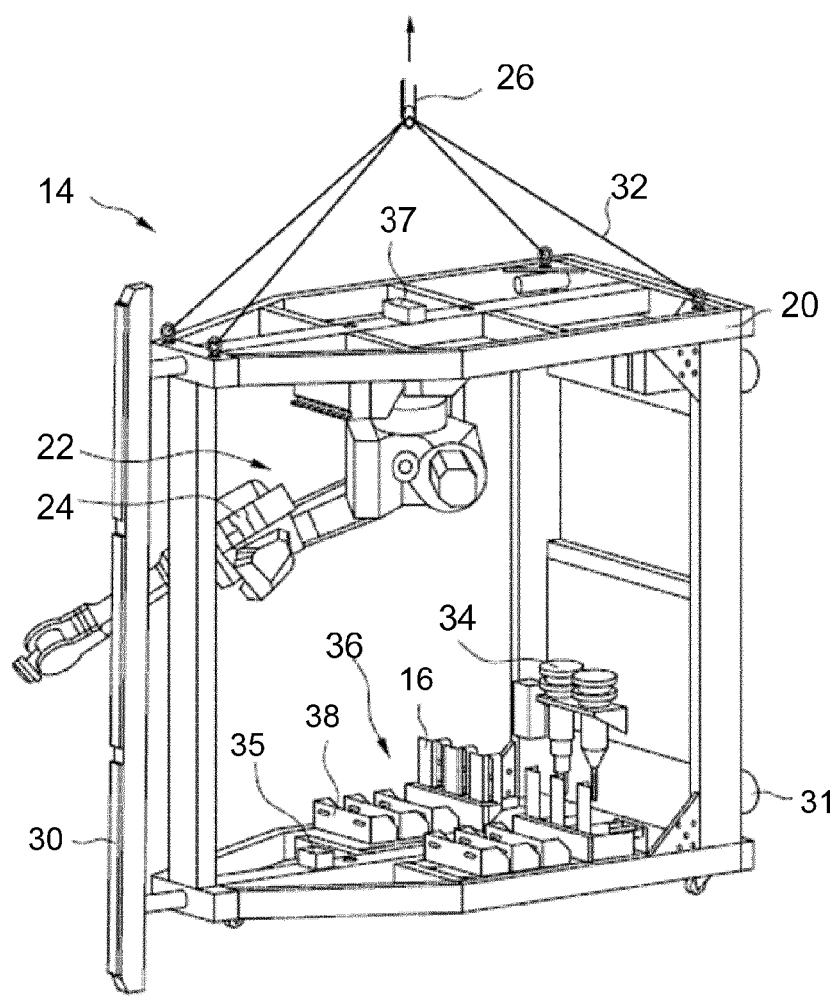
FIG. 2 shows a perspective view of an assembly device.

FIG. 2 shows an enlarged view of an assembly device 14.

Support component 20 is constituted as a cage-like frame, wherein a plurality of horizontally and vertically running spars form a mechanically loadable structure.

Fitted at the top on cage-like support component 20 are holding ropes 32, which can be connected to support means 26. Moreover, control device 37 for controlling assembly device 14 is arranged at the top on support component 20.

In the embodiment represented, mechatronic installation component 22 is implemented with the aid of an industrial robot 24. In the example represented, industrial robot 24 is equipped with a plurality of robot arms which can be swiveled about swivel axes. For example, the industrial robot has at least six degrees of freedom, i.e. an assembly tool 34 guided by industrial robot 24 can be moved with six degrees of freedom, i.e. for example with three degrees of freedom in rotation and three degrees of freedom in translation. For example, the industrial robot can be constituted as a vertical articulated arm robot, as a horizontal articulated arm robot or as SCARA robot or as a Cartesian robot or gantry robot.

The robot can be coupled at its cantilever end with various assembly tools 34. Assembly tools 34 can differ with regard to their design and their intended purpose. Assembly tools 34 can be held at a support component 20 in such a way that the cantilever end of industrial robot 24 can be advanced towards it and can be coupled with one of them. For this purpose, industrial robot 24 can for example comprise a tool exchange system, which is constituted such that it enables at least the handling of a plurality of such assembly tools 34.

One of assembly tools 34 is constituted as a sensor, for example as a laser scanner, by means of which the relative position of support component 20 can be determined with respect to reference elements 13. This can be carried out for example with a method which is described in WO 2017/167719 A1. The position of support component 20 in elevator shaft 10 can be determined from the relative position of support component 20 with respect to reference elements 13. On the basis of the position of support component 20, it can be determined at which points of shaft wall 18 a rail bracket lower part 16 is to be fastened. The planned position of a rail bracket lower part 16 on shaft wall 18 can thus be determined. A distance of the laser scanner to a wall point of shaft wall 18 can also be measured with the laser scanner. With the knowledge of the position of the laser scanner, the position of the wall point can thus be determined. A surface contour of a wall area of shaft wall 18 can be determined by determining the positions of a multiplicity of wall points. The evaluation of the surface structure thus determined will be dealt with in connection with FIGS. 6 and 7.

One of the assembly tools 34 is constituted as a reinforcement detection component 35. The reinforcement detection component 35 is designed to detect a reinforcement inside shaft wall 18. For this purpose, the reinforcement detection component can make use for example of physical measurement methods, in which electrical and/or magnetic properties of the typically metallic reinforcement inside a concrete wall are used in order to detect the precise position of this reinforcement.

One of assembly tools 34 is constituted as a drilling tool, similar to a percussion drilling machine. By coupling industrial robot 24 with one such drilling tool, installation component 22 can be designed to enable drilling of the drill holes controlled at least partially in an automated manner in one of shaft walls 18 of elevator shaft 10. The drilling tool can be moved and handled by industrial robot 24 in such a way that the drilling tool with the drill at the intended drilling position drills holes in shaft wall 18 of elevator shaft 10, into which fastening means in the form of anchor bolts for fixing rail bracket lower parts are subsequently driven in.

A further assembly tool 34 is constituted as a drive-in tool, in order to drive in at least partially automatically anchor bolts into previously drilled drill holes in shaft wall 18 of elevator shaft 10.

A further assembly tool 34 is constituted as a gripper in order to fasten at least partially automatically a rail bracket lower part 16 to shaft wall 18.

A magazine component 36 can also be provided on support component 20. Magazine component 36 can be used to store rail bracket lower parts 16 to be installed and to make them available to installation component 22. Anchor bolts can also be stored in bins 38 and made available in magazine component 36, which with the aid of installation component 22 can be driven into previously produced drill holes in shaft wall 18.

According to FIGS. 3 and 4, a component constituted as a rail bracket lower part 16, which is fastened to shaft wall 18, comprises a first part 41 running in the fastened state in main extension direction 11 and therefore vertically and a second part 42 arranged perpendicular to the latter and running in the fastened state perpendicularly away from shaft wall 18 and therefore horizontally. First part 41 forms a contact surface 43, which abuts against a corresponding support surface 44 of shaft wall 18 and is therefore supported in it. First part 41 comprises two through-openings 45, through which a fastening means in the form of an anchor bolt 46 projects in each case. Anchor bolts 46 are driven in in each case into a drill hole 47 in shaft wall 18. Rail bracket lower part 16 is pressed and therefore held against support surface 44 of shaft wall 18 by means of two nuts 48 screwed onto anchor bolts 46. Through-openings 45 are constituted as elongated holes, which are aligned perpendicular to main extension direction 11 and therefore horizontally. As long as nuts 48 have not yet been tightened up, rail bracket lower part 16 can thus be displaced to a certain extent in the horizontal direction with respect to anchor bolts 46. By means of second part 42 of rail bracket lower part 16, a rail bracket upper part (not represented) can be fixed to rail bracket lower part 16 and therefore to shaft wall 18. A guide rail is fastened to rail bracket upper part, which is thus also fixed to shaft wall 18.

Figure 6:
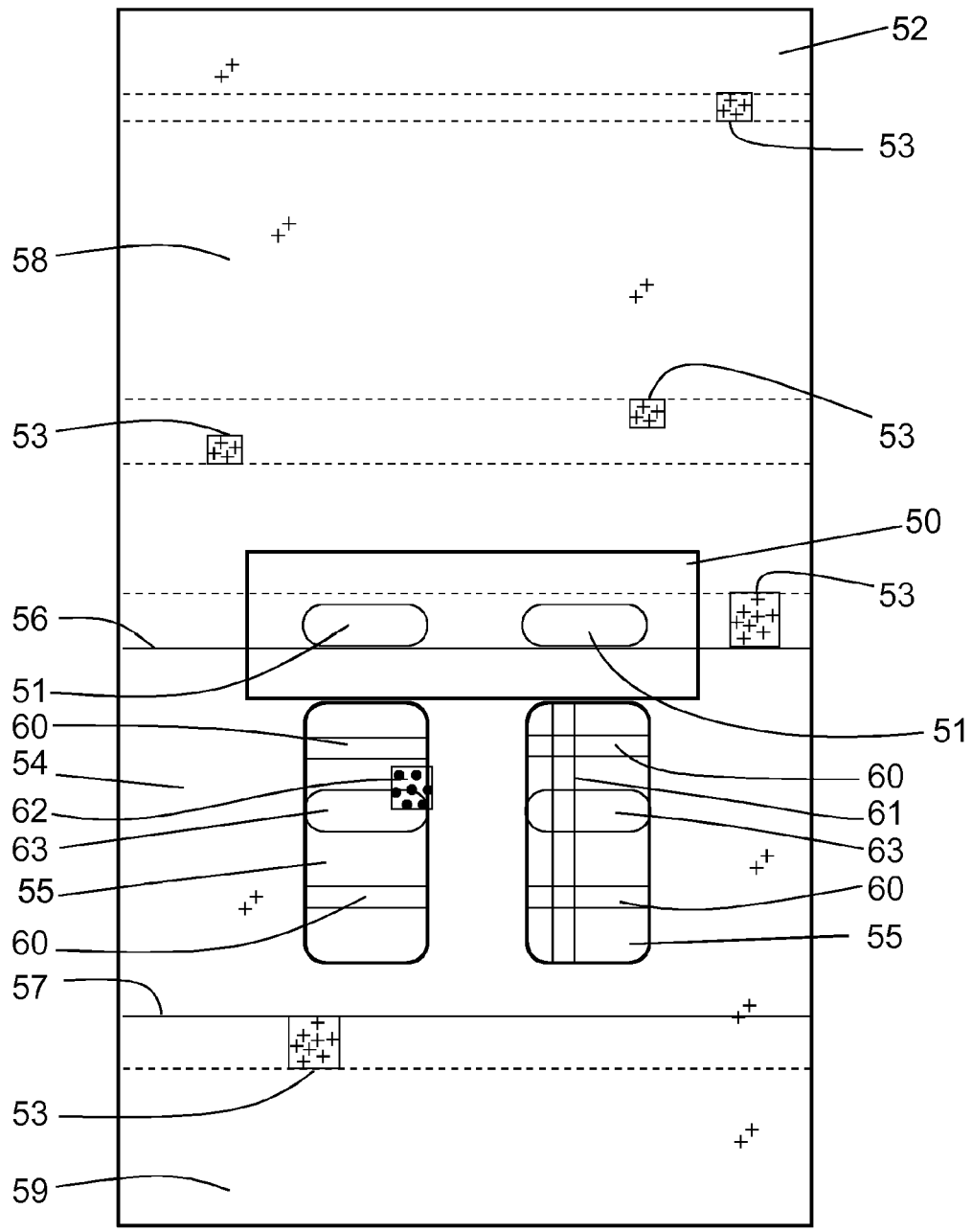
FIG. 6 shows a possible wall area in an enlarged representation and FIG. 7 shows a detail of a possible area in an enlarged representation.
Figure 7:
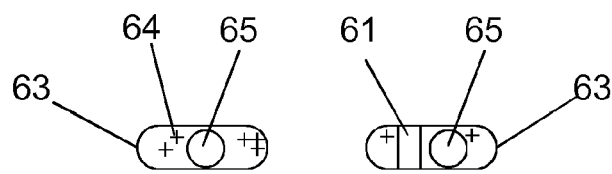

The following provides a description with the aid of FIGS. 5, 6 and 7 as to how the drilling positions for drill holes 47 are determined. As described above, control device 37 determines a planned position of rail bracket lower part 16. A planned support surface 50 on shaft wall 18 is obtained from this, at which contact surface 43 of rail bracket lower part 16 is intended to abut against shaft wall 18. Planned drilling position areas 51 for drill holes 47 are thus also obtained. Since through-openings 45 of rail bracket lower part 16 are constituted, as described, as elongated holes, the support surface can be displaced proceeding from planned support surface 50, in the horizontal and therefore in a first direction (x) by a certain distance in both directions. Moreover, the support surface can be displaced, proceeding from planned support surface 50, in the vertical direction and therefore in main extension direction 11 and thus in a second direction (z). The amount of the displacement is limited by the possible work area of assembly device 14 at its current position, i.e. by the area of shaft wall 18 in which assembly device 14 can carry out assembly steps in an automated manner. A possible wall area 52 of shaft wall 18 thus results, at which support surface 44 and therefore the drilling positions of drill holes 47 can be arranged. Possible wall area 52 is, like remaining shaft wall 18, chiefly flat and extends in the aforementioned first direction (x) and the second direction (z) perpendicular to the first direction (x).

In order to determine the drilling positions of drill holes 47, the positions of individual wall points inside possible wall area 52 and therefore the surface structure of wall area 52 are determined as described above by means of a laser scanner 34. The individual wall points have for example a distance of 1 to 4 mm from one another. Proceeding from the positions of the individual wall points, an ideal wall surface is determined with the so-called RANSAC algorithm. In the present example, it is assumed that the ideal wall surface extends in the first direction (x) and the second direction (z) perpendicular to the first direction (x). Distances of the individual wall points from the ideal wall surface thus correspond to a position of the wall points in a third direction perpendicular to the first and second direction.

The surface contour of wall area 52 is then examined with a first detection rule, in order to detect first irregularities. For this purpose, the wall points are determined, the distance of which from the ideal wall surface is greater than a first threshold value of 10 mm. Adjacent wall points which meet the aforementioned condition are then combined. In the combination of the wall points, the wall points are combined which meet the aforementioned condition and moreover have a distance from another wall point meeting the aforementioned condition which is smaller than a limiting distance of 10 mm. In addition, a rectangle is defined in the combination, which contains all the aforementioned wall points and the edges of which run in the aforementioned first direction (x) or the aforementioned second direction (z). A first irregularity is detected when a surface area of the combined wall points, i.e. the aforementioned rectangle, is greater than a limiting surface area of 20 cm$^2$.

FIG. 6 represents the result of the use of the first detection rule. Wall points, the distance of which from the ideal wall surface is greater than the first threshold value, are characterized by a cross. As soon as a rectangle surrounding adjacent wall points is a surface area greater than the aforementioned limiting surface area, the rectangle is also represented. In the example represented in FIG. 6, the possible wall surface thus contains a total of five first irregularities 53.

A primary possible support surface area 54 and two primary possible drilling position areas 55 are then determined. Primary possible support surface area 54 has a rectangular shape and extends in the first direction (x) over entire possible wall area 52. In the second direction (z), it is limited upwards by a first line 56 and downwards by a second line 57. Primary possible support surface area 54 is characterized in that it contains no first irregularity 53 large enough to accommodate support surface 44 and compared to other areas 58, 59 meeting this condition has the smallest distance from planned support surface area 50. The two primary possible drilling position areas 55 result from primary possible support surface area 54 and the position of the two through-holes relative to support surface 44.

A course of reinforcements in shaft wall 18 is then determined in primary possible drilling position areas 55. In the example represented in FIG. 6, two horizontally running reinforcements 60 are present in the two primary drilling position areas 55 and one vertically running reinforcement 61 is present only in right-hand primary drilling position area 55.

After the determination of the course of reinforcements 60, 61, the surface contour of the two primary drilling position areas 55 is examined with a third detection rule in order to detect third irregularities. The detection proceeds analogously to the detection described above of the first irregularities. The difference solely consists in the fact that a third threshold value of 5 mm is used. The limiting distance and the limiting surface area remain unchanged. In the example represented in FIG. 6, a third irregularity 62 results only in left-hand primary drilling position area 55.

When subsequent account is taken of third irregularities 62, horizontally running reinforcements 60 are also taken into account. For this purpose, an examination is first made to establish whether planned drilling position areas 51 lie inside the two primary possible drilling position areas 55. This is not the case in the example represented in FIG. 6. For this reason, start areas for a secondary possible drilling position area are determined from planned drilling position area 51, in such a way that planned drilling position areas 51 are displaced in a main displacement direction, which runs here vertically, i.e. in the second direction (z), to an extent such that they lie inside the two primary possible drilling position areas 55. An examination is then made to establish whether a reinforcement 60 running in the horizontal direction is present in one of the start areas for the secondary possible drilling position areas. This is the case here in the right-hand start area, so that a further displacement in the main displacement direction downwards is required. Apart from the examination for a reinforcement 60 running in a horizontal direction, an examination is also made to establish whether a degree of overlap of, in each case, a through-opening 45 of rail bracket lower part 16 with third irregularity 62 is smaller than a first threshold value of 30% related to a through-opening. The two aforementioned conditions concerning reinforcements 60 and third irregularities 62 are met in secondary possible drilling position areas 63.

The surface contour of the two secondary possible drilling position areas 63 is then examined with a second detection rule in order to detect second irregularities. For this purpose, wall points are determined, the distance of which from the ideal wall surface is greater than a second threshold value of 4 mm. In the two secondary possible drilling position areas 63, second irregularities 64 arise, which are represented with crosses, for reasons of clarity not in FIG. 6 but in separate FIG. 7. Drilling position 65 is then determined inside each of the two secondary possible drilling position areas 63, which on the one hand do not have any second irregularities 64 and moreover have a maximum distance from reinforcement 61. Drilling positions 65 are thus determined, so that assembly device 14 can drill holes in shaft wall 18 at these drilling positions 65 in an automated manner.

If no drilling positions 65 can be found inside the two secondary possible drilling position areas 63, which do not have any second irregularities 64 and do not collide with a reinforcement 60, 61, new secondary possible drilling areas are sought by means of a further displacement of the two secondary possible drilling position areas 63 inside the two primary possible drilling areas 55 as described above. In these new secondary possible drilling areas, an examination for second irregularities and reinforcements is then again carried out as described. The described approach is repeated until such time as either suitable drilling positions have been found or the entire primary possible drilling position areas has been examined without success.

If suitable drilling positions are still unable to be found, an examination is made to establish whether there are further possible primary support surface areas 58, 59 beside from the already examined primary possible support surface area 54 of wall area 52. If this is the case, the primary possible support surface area is selected as the new primary possible support surface area, which lies closest to the planned support surface area. Suitable drilling positions are then sought inside the new primary support surface area, as described. If the search is again without success, the described examination is repeated for a new possible primary support surface area.

If no suitable drilling positions are found inside a possible wall area 52, a new possible wall area is selected. The new possible wall area results from a displacement of the original possible wall area in the main displacement direction. The displacement takes place in such a way that a primary possible support surface area and a primary possible drilling position area, which are at an edge of the original possible wall area 52 lying in a main displacement direction, are also contained in the new possible wall area. The displacement takes place so that the aforementioned overlapping area between the original and the new wall area is as large as possible. The direction of the displacement, for example vertically upwards or downwards, thus also emerges. In the example represented in FIG. 6, the wall area would therefore be displaced downwards. In order to be able to search for suitable drilling positions inside the new possible wall area, assembly device 14 is correspondingly displaced inside the elevator shaft 10. As described, suitable drilling positions are then sought inside the new possible wall area.

If drilling positions have been found inside a possible wall area which do not have any second irregularities, but no distance from reinforcements or one that is too small, such drilling positions can also be determined as suitable drilling positions instead of a displacement of the possible wall area. This decision is taken in particular by an operator of assembly device 14.

Finally, it should be pointed out that terms "comprising", "including", etc. do not exclude any other elements or steps in the same way as "a/an" does not exclude a plurality. Furthermore, it should be pointed out that features or steps which have been described by reference to one of the above examples of embodiment can also be used in combination with other features or steps of other examples of embodiment described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for automated determination of a drilling position of a drill hole for receiving a fastener for fastening a component to a possible wall area of a wall, the component including a contact surface and a through-opening, wherein, when the component is fastened to the wall, at least a part of the contact surface abuts against a support surface of the wall and the fastener is fixed in the drill hole and projects through the through-opening, wherein the possible wall area is flat and extends in a first direction and a second direction perpendicular to the first direction, and wherein a planned support surface with a planned drilling position area for the drill hole are preselected inside the possible wall area, the method comprising the following steps:
    determining a first surface contour of the possible wall area;
    examining the first surface contour and detecting any first irregularities in the first surface contour using a first detection rule;
    determining a primary possible support surface area and a primary possible drilling position area for the drill hole that do not have any of the detected first irregularities;
    examining a second surface contour of the primary possible drilling position area and detecting any second irregularities in the second surface contour using a second detection rule; and
    determining a drilling position for the drill hole inside the primary possible drilling position area that does not have any of the detected second irregularities.

2. The method according to claim 1 including determining the primary possible support surface area such that a distance between the planned support surface and the primary possible support surface area is minimized.

3. The method according to claim 1 wherein, when the first surface contour is determined, includes the further steps of:
    determining positions of wall points inside the possible wall area;
    determining an ideal wall surface using the positions of the wall points; and
    determining distances of the individual wall points from the ideal wall surface in a third direction perpendicular to the first and second directions.

4. The method according to claim 3 wherein the first detection rule for detecting the first irregularities in the first surface contour includes the steps of:
    determining ones of the wall points meeting a condition that the determined distance from the ideal wall surface is greater than a first threshold value;
    combining adjacent ones of the wall points that meet the condition; and
    detecting one of the first irregularities when a surface area of the combined wall points is greater than a limiting surface area.

5. The method according to claim 3 wherein the second detection rule for detecting the second irregularities in the second surface contour includes the steps of:
    determining ones of the wall points meeting a condition that the distance from the ideal wall surface is greater than a second threshold value; and
    detecting the second irregularity at each of the wall points that meets the condition.

6. The method according to claim 3 wherein, between the determining of the primary possible drilling position area and the determining of the drilling position, detecting third irregularities in the second surface contour using a third detection rule including the steps of:
    determining ones of the wall points meeting a condition that the distance from the ideal wall surface is greater than a third threshold value;
    combining adjacent ones of the wall points that meet the condition to detect one of the third irregularities; and
    determining a secondary possible drilling area for the drill hole based upon the detected third irregularities.

7. The method according to claim 6 including determining the secondary possible drilling area for the drill hole such that a degree of overlap of the through-opening of the component with the detected third irregularities is less than a first limiting value.

8. The method according to claim 6 wherein the determining the secondary possible drilling area is limited to displacement in a main displacement direction parallel to the possible wall area.

9. The method according to claim 1 wherein the primary possible support surface area is shaped as a rectangle having edges each running in the first direction or in the second direction and wherein the rectangle extends in the first direction over an entirety of the possible wall area.

10. The method according to claim 1 including determining a course of reinforcements in the wall in the primary possible drilling position area for the drill hole and taking into account the reinforcement courses in determining the drilling position.

11. The method according to claim 10 including taking into account the reinforcement courses together with only the detected second irregularities, only third irregularities, or only with the detected second irregularities and the third irregularities, wherein, between the determining of the primary possible drilling position area and the determining of the drilling position, detecting the third irregularities in the second surface contour using a third detection rule including the steps of determining ones of the wall points meeting a condition that the distance from the ideal wall surface is greater than a third threshold value, combining adjacent ones of the wall points that meet the condition to detect one of the third irregularities, and determining a secondary possible drilling area for the drill hole based upon the detected third irregularities.

12. The method according to claim 10 including determining the drilling position of the drill hole such that a distance of the drilling position from the reinforcement courses is maximized.

13. The method according to claim 1 including when no drilling position of the drill hole is inside the possible wall area is determined, selecting a new possible wall area and repeating the steps of the method for the new possible wall area.

14. The method according to claim 13 including performing steps of the method using an assembly device for implementing automated assembly steps and displacing the assembly device for the selection of the new possible wall area.

15. An assembly device for automated determination of a drilling position of a drill hole for a fastener for fastening a component to a possible wall area of a wall, wherein the component includes a contact surface and a through-opening, wherein, when the component is fastened to the wall, at least a part of the contact surface abuts against a support surface of the wall and the fastener is fixed in the drill hole and projects through the through-opening, wherein the possible wall area is flat and extends in a first direction and a second direction perpendicular to the first direction, and wherein a planned support surface with a planned drilling position area for the drill hole are preselected inside the possible wall area, the assembly device comprising:

a control device controlling the assembly device to perform the following steps,
  determination of a surface contour of the possible wall area,
  examination of the surface contour and detection of any first irregularities in the surface contour using a first detection rule,
  determination of a primary possible support surface area and a primary possible drilling position area for the drill hole that do not have any of the detected first irregularities,
  examination of a portion of the surface contour in the primary possible drilling position area for the drill hole and detection of any second irregularities in the portion of the surface contour using a second detection rule, and
  determination of a drilling position for the drill hole inside the primary possible drilling position area that does not have any of the detected second irregularities.

* * * * *